June 21, 1960  A. A. KUZMITZ  2,941,358
COMPRESSOR PRESSURE LIMITER FOR GAS TURBINE ENGINES
Filed July 28, 1954
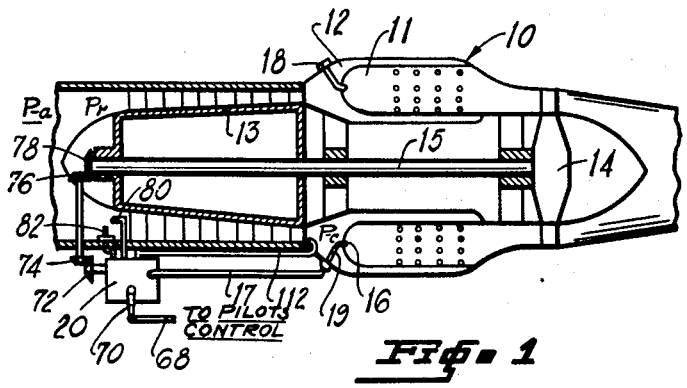
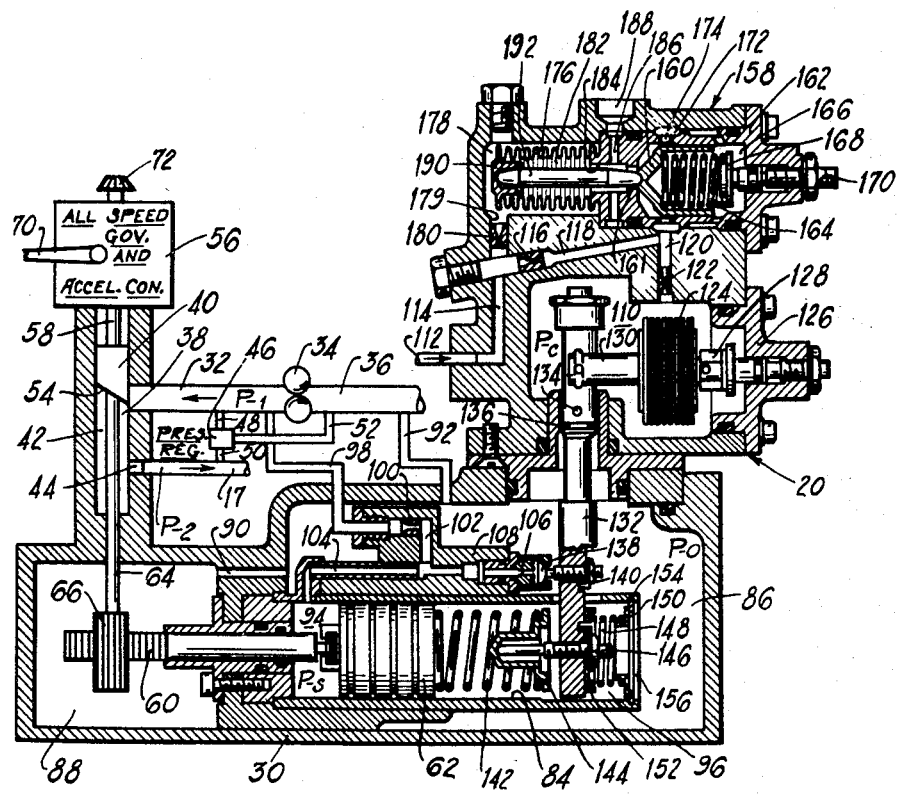
INVENTOR.
ANDREW A. KUZMITZ
BY
*J. C. Wiessler*
ATTORNEY

United States Patent Office 2,941,358
Patented June 21, 1960

2,941,358

COMPRESSOR PRESSURE LIMITER FOR GAS TURBINE ENGINES

Andrew A. Kuzmitz, South Bend, Ind., assignor to Bendix Aviation Corporation, South Bend, Ind., a corporation of Delaware Filed July 28, 1954, Ser. No. 446,336

6 Claims. (Cl. 60—39.28)

This invention relates to a fuel feed and power control device for gas turbine engines and more particularly to such a device utilizing means for maintaining compressor discharge pressure or compressor rise under a predetermined maximum value.

It is a primary object of this invention to control fuel flow to engines of the type specified in such a manner that excessive, or possibly dangerous compressor pressures cannot be attained.

It is a further object of this invention to provide relatively simple means which is adapted to maintain compressor discharge pressure within a safe range during engine operation.

The above and other objects and features of this invention will become apparent from the following description of the device taken in conjunction with the accompanying drawings wherein:

Figure 1 is a sectional view of a turbo-jet engine equipped with a fuel feed and power control device in accordance with the invention; and Figure 2 is a schematic sectional view of a portion of the fuel feed and power control device used on the engine of Figure 1.

Referring now to Figure 1, a gas turbine is generally indicated at 10 and includes a series of annularly disposed combustion chambers 11 mounted in a casing having a header or air intake section 12, and a compressor 13, shown as of the axial flow type, which is driven by means of a turbine 14 through a shaft 15. Each of the combustion chambers is provided with a burner nozzle 16 to which metered fuel is supplied under pressure by way of a conduit 17, a fuel manifold 18 and individual fuel lines 19. The conduit 17 receives metered fuel from a fuel control device generally indicated at 20 in Figure 1 and partially shown in sectional schematic in Figure 2, which will now be described.

Mechanism included in the fuel control device 20 is enclosed within a housing 30 to which pressurized fuel is supplied through a conduit 32 at a pressure $P_1$ by a pump 34, which is connected to a source of fuel, not shown, by a conduit 36. From conduit 32, fuel flows to the nozzles 16 by way of a metering orifice 38, the area of which is controlled by a main metering valve 40, a chamber 42, a discharge port 44, the discharge conduit 17 at $P_2$ pressure, and fuel manifold 18. A pressure regulator valve, shown in block diagram at 46, is connected to conduits 32, 17 and 36 by means of passages 48, 50 and 52, respectively, and is adapted to maintain a constant pressure drop across metering orifice 38 under all conditions of engine operation, and at all positions of valve 40.

Metering valve 40 is axially and rotatably actuable within chamber 42 to control the metering area of orifice 38 and is formed with a sloping area control face 54, said valve being connected to an all-speed governor and acceleration control unit 56 by a valve stem 58, and being connected to a reciprocable rack 60, which is positioned by a servo motor piston 62, by a valve stem 64 and a splined member 66.

Unit 56 may include governor setting and acceleration speed control mechanism such as is shown in my copending application Serial No. 413,318, filed March 1, 1954, now abandoned, which is assigned to the same assignee, for controlling the axial position of metering valve 40, said unit being connected to a pilot's control lever, not shown, by a link 68 and lever 70, to the engine drive shaft 15 by bevel gears 72, 74 and 76, 78, and to compressor inlet pressure and temperature by a pressure pick up tube 80 and a temperature probe 82, respectively (see Figure 1).

The angular position of valve 40, and therefore the metering area of orifice 38, is varied with variations in the position of servo piston 62, which is positionally controlled within an open end cylinder 84 by a mechanism to be described. Cylinder 84, and rack and spline 60 and 66 are disposed within housing cavities 86 and 88, respectively, which are interconnected by a passage 90 and are connected to pump inlet conduit 36, at pressure $P_0$, by a conduit 92. Piston 62 forms chambers 94 and 96 on either side thereof within cylinder 84, chamber 94 being connected to pump discharge conduit 32 by a conduit 98, a restriction 100, and passages 102 and 104, and being connected to chamber 86 by conduit 104 and a calibrated restriction 106, which latter restriction is held in a fixed position by a portion 108 of housing 30.

An air chamber 110 is connected to the discharge side of compressor 13 by means of a pressure pick up conduit 112, a passage 114, a pressure limiter bleed 116, passages 118 and 120 and a damping bleed 122; the chamber contains an evacuated bellows 124 which is suitably anchored to a cover plate 126 of housing 30 by a member 128 and which is operatively connected to piston 62 by a link 130, a lever 132 fulcrumed at 134 and having a sealing O-ring 136, a half-ball servo valve 138 connected to lever 132 at 140 and controlling the effective area of restriction 106, and a piston spring 142 connected to lever 132 by retainer 144 and screw 146. A balance spring 148 urges lever 132 in a clockwise direction and is disposed between spring retainers 150 and 152, retainer 150 being held against a cylinder stop ring 154 and retainer 152 being connected to lever 132 by screw 146. Chamber 96 to the right of piston 62 in cylinder 84 communicates with chamber 86 through the open end 156 of said cylinder.

A compressor pressure limiter 158 is contained within the upper part of housing 30 and comprises a valve member 160 which is normally held in closed or seated position in an orifice 161 of an orifice, sleeve and cover plate member 162, by a spring 164 mounted in a valve chamber 166 so as to abut said valve and anchor on a flange 168 of a screw member 170. Chamber 166 is connected to passage 118 by way of an annulus 172 and a plurality of annularly disposed ports 174 in member 162. A bellows 176 is mounted on the left end of orifice and sleeve member 162 in a chamber 178, which is connected to compressor discharge pressure conduit 114 by a passage 1?? in which is contained a safety bleed 180, and forms an internal chamber 182 which is connected to the inlet side of compressor 13 or to atmospheric pressure ($P_a$) by a port and passage 184 and 186 in member 162, a port 188 in housing 30 and a conduit, not shown, said bellows having a closed end 190 and being connected to valve 160 by a rod 192. If desired, both ends of bellows 176 could be sealed and said bellows evacuated, whereby the bellows would respond to compressor discharge pressure ($P_c$) only.

As shown, the bellows 176 is responsive, under certain conditions, to compressor differential pressure ($P_c$ minus $P_a$), and a force, having a value which is equal to the compressor differential pressure times the cross sectional area of the bellows, is continuously applied to the bellows during operation of the engine in a direction which tends to open valve 160. The spring 164 is designed to maintain valve 160 seated in orifice 161 during all normal conditions of operation, said valve being actuated in an open direction by the bellows and rod 176 and 192 only when the compressor differential pressure exceeds a predetermined maximum value. Of course, if bellows 176 were sealed at both ends and evacuated, valve 160 would be actuated in an opening direction following generation of an excessive compressor discharge pressure absolute by the compressor. Obviously, bellows 176 can, if desired, be made responsive to the differential pressure between any two selected compressor stages, or to a single pressure existent in any one selected compressor stage. Whenever valve 160 is held open by the action of bellows 176, compressor discharge pressure in chamber 110 is immediately reduced by being vented to compressor inlet or atmospheric pressure through damping bleed 122, passage 120, annulus and ports 172 and 174, chamber 166, orifice 161, passage 186, port 188, and the conduit, not shown, which may be connected to the compressor inlet section or to the atmosphere.

Operation

The various parts of the applicant's control 20 are illustrated as they would appear if the engine 10 were operating at a low power steady state condition, such as a condition of engine idle operation. The all-speed governor portion of unit 56 is controlling the axial position of metering valve 40 such that an amount of fuel is metered at orifice 38 which will maintain an idle condition of operation at any given angular position of said valve. The angular position of valve 40 is controlled as a function of pressure $P_c$, which when applied to bellows 124 maintains servo valve 138 in such a position, with respect to restriction 106, that the resulting servo pressure $P_s$ maintains the position of servo motor piston 62 such that the moment force of piston spring 142, acting about fulcrum 134 of lever 132, less the moment force of balance spring 148, substantially balances the moment force of bellows 124, which also acts about said fulcrum. This force balance may be momentarily upset as a result of a change in pressure $P_c$, but is substantially instantaneously restored as a result of the action of servo valve 138 which causes pressure $P_s$ to vary as necessary to reposition piston 62 and alter the force output of springs 142 and 148 the required amount. The angular position of valve 40 and the area of metering orifice 38 is therefore always a desired function of pressure $P_c$.

To accelerate the engine the pilot rotates lever 70 so as to reset the governor and actuate valve 40 upwardly, which initiates an increase in fuel flow. As the engine begins to accelerate, pressure $P_c$ increases and, as applied to bellows 124, tends to rotate lever 132 clockwise, and move servo valve 138 toward restriction 106 to decrease the effective flow area thereof; such movement of valve 138 results in an increasing servo pressure $P_s$ in chamber 94 which actuates piston 62 to increase the loading of piston spring 142 and rotate valve 40 in a direction to increase the opening of metering orifice 38. The servo piston 62 travel continues during acceleration of the engine until the piston spring is compressed to exert a moment force about fulcrum 134 which balances the new moment force of $P_c$ pressure acting on the evacuated bellows plus the moment force of balance spring 148. Such a balanced condition would be attained at the new selected condition of engine operation.

If at any time during such an acceleration of the engine, the differential pressure across the compressor should exceed a predetermined maximum value, as determined by the force output of spring 164, bellows 176 would compress to actuate valve 160 in an opening direction, whereby a false $P_c$ pressure signal would be applied to bellows 124 as a result of bleeding pressure $P_c$ down through orifice 161 to compressor inlet or atmospheric pressure. This latter action would result in a temporary expansion of bellows 124 which would cause piston 62 to be actuated in a fuel flow decreasing direction until compressor differential pressure decreased to a safe value and valve 160 reseated. Upon reseating of valve 160, full $P_c$ pressure would again be applied to bellows 124 and the angular position of valve 40 would be re-established to control fuel flow as a function of existing $P_c$ pressure.

The safety bleed 180 controls the $P_c$ pressure level in chamber 110 in the event of a failure of bellows 176: Without this bleed, a limiter bellows failure could cause a substantially complete loss of $P_c$ pressure in said chamber and consequent sharp reduction of fuel flow due to metering valve rotation. If the limiter bellows 176 were to fail with the safety bleed 180 installed, $P_c$ pressure would be reduced; however, reduction of fuel flow would be small as compared to that which would result if said bleed were not used. The damping bleed 122 in passage 120 dampens undesirable fluctuations in the pressure in chamber 110. The pressure limiter bleed 116 is inserted in passage 118 to limit the maximum pressure attainable in chamber 110 whenever limiter valve 160 is open.

Although only one specific embodiment of my invention has been included in the description it will be understood that variations may be made without departing from the scope of the invention.

I claim:

1. In a fuel feed and power control system for gas turbine engines having a burner and a compressor, a conduit for delivering fuel to the burner, a metering orifice in said conduit, a metering valve for controlling the effective area of said orifice, a chamber communicating with compressor discharge pressure, a bellows mounted in said chamber and normally responsive to said pressure, an operative connection between said valve and said bellows including movable motor means for actuating said valve, servo means for controlling the position of said motor means and spring means connected to said motor means, to said bellows and to said servo means such that a substantial equilibrium of forces between said spring means and said bellows results whenever the position of said motor means is unchanging, and compressor pressure limiting means for reducing the pressure in said chamber including a passage adapted to communicate said chamber with atmospheric or compressor inlet pressure, a normally closed valve in said passage, spring means urging said latter valve toward closed position and a bellows responsive to a differential pressure across the compressor for actuating said latter valve in an open direction at a predetermined value of said differential pressure.

2. In a fuel feed and power control system for gas turbine engines having a burner and a compressor, a conduit for delivering fuel to the burner, a metering orifice in said conduit, a metering valve for controlling the effective area of said orifice, movable motor means for controlling the position of said valve, a servo fluid pressure chamber formed on one side of said motor means, resilient means acting on said motor means in opposition to the fluid pressure in said chamber, a compressor pressure responsive means, servo valve means for controlling the fluid pressure in said chamber, lever means interconnecting said compressor pressure responsive means, said servo valve means and said resilient means in such a manner that an increase in compressor pressure increases the moment of force of said pressure responsive means on said lever means to increase said servo fluid pressure which actuates said motor means in opposition to said resilient means until said resilient means produces a moment of force on said lever means substantially equal to the moment of force produced by said pressure responsive means, and compressor pressure limiting means operatively connected to said compressor pressure responsive means.

3. In a fuel feed and power control system for gas turbine engines having a burner and a compressor, a conduit for delivering fuel to the burner, a metering orifice in said conduit, a metering valve for controlling the effective area of said orifice, an air pressure chamber, a bellows in said chamber and operatively connected to said valve for controlling the metering position thereof, passage means adapted to communicate said chamber with compressor discharge pressure and with atmospheric or compressor inlet pressure, normally closed valve means downstream of said chamber for interrupting communication of said chamber with atmospheric or compressor inlet pressure, and pressure responsive means having opposite sides which are sealed from each other, a fluid connection between one of said sides and said passage means upstream from said normally closed valve means, a second fluid connnection between the other of said sides and said passage means downstream from said normally closed valve means, said pressure responsive means being operatively connected to said normally closed valve means for opening said valve means when a predetermined pressure differential between compressor discharge and atmospheric or compressor inlet pressure is attained, and a restriction in said first fluid connection for minimizing the loss of air at compressor discharge pressure from said first fluid connection to said second fluid connection in the event that said seal between said opposite sides is broken.

4. In a fuel feed and power control system for gas turbine engines having a burner and a compressor, a conduit for delivering fuel to the burner, a metering valve for controlling the flow of fuel through said conduit, pressure responsive means operatively connected to said metering valve for controlling the position thereof, passage means for communicating compressor discharge pressure with said pressure responsive means and with a source of relatively low fluid pressure, normally closed valve means in said passage means and downstream of said pressure responsive means for interrupting communication of compressor discharge pressure with said source of relatively low fluid pressure, pressure responsive means in pressure communication with said passage means and connected to said normally closed valve means for actuating said latter valve means in an opening direction following an increase in pressure in said passage means in excess of a predetermined value, said latter mentioned pressure responsive means being connected to said passage means at points upstream and downstream of said normally closed valve means respectively, and a safety bleed in said upstream connection.

5. In a control system as claimed in claim 2 wherein said compressor pressure limiting means includes a bellows, a fluid connection communicating said bellows and said compressor pressure responsive means with a source of relatively low pressure fluid and normally closed valve means operatively connected to and actuated by said bellows for controlling fluid flow through said fluid connection to said relatively low pressure fluid source, said valve means being actuated to an open position by said bellows when a predetermined limiting compressor discharge pressure is attained.

6. In a fuel feed and power control system for gas turbine engines having a burner and a compressor, a conduit for delivering fuel to the burner, a metering valve for controlling the flow of fuel through said conduit, pressure responsive means operatively connected to said metering valve for controlling the position thereof, passage means for communicating a compressor generated pressure with said pressure responsive means and with a source of relatively low fluid pressure, normally closed valve means in said passage means and downstream of said pressure responsive means for interrupting communication of said compressor generated pressure with said source of relatively low fluid pressure, and pressure responsive means in pressure communication with a compressor generated pressure and connected to said normally closed valve means for actuating said latter valve means in an opening direction following an increase in the comprressor generated pressure communicated to said latter mentioned pressure responsive means in excess of a predetermined value, and a safety bleed in said pressure communication in series flow therewith.

References Cited in the file of this patent

UNITED STATES PATENTS

| | | |
|---|---|---|
| 2,668,416 | Lee | Feb. 9, 1954 |
| 2,670,599 | Davies et al. | Mar. 2, 1954 |
| 2,678,533 | Lawrence | May 18, 1954 |
| 2,694,290 | Best | Nov. 16, 1954 |
| 2,757,511 | Jagger | Aug. 7, 1956 |
| 2,822,666 | Best | Feb. 11, 1958 |